(12) United States Patent
Gheorghiu et al.

(10) Patent No.: US 11,476,984 B2
(45) Date of Patent: Oct. 18, 2022

(54) FLEXIBLE SPECTRUM USAGE WITH CARRIER AGGREGATION

(71) Applicant: QUALCOMM Incorporated, San Diego, CA (US)

(72) Inventors: Valentin Alexandru Gheorghiu, Yokohama (JP); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/030,253

(22) Filed: Sep. 23, 2020

(65) Prior Publication Data

US 2021/0091897 A1 Mar. 25, 2021

Related U.S. Application Data

(60) Provisional application No. 62/905,992, filed on Sep. 25, 2019.

(51) Int. Cl.
*H04W 4/00* (2018.01)
*H04L 5/00* (2006.01)
(Continued)

(52) U.S. Cl.
CPC ............ *H04L 5/001* (2013.01); *H04L 5/0048* (2013.01); *H04W 24/10* (2013.01); *H04W 48/16* (2013.01); *H04W 56/001* (2013.01)

(58) Field of Classification Search
CPC ..... H04L 5/001; H04L 5/0048; H04L 5/0092; H04L 5/0098; H04W 24/10; H04W 48/16; H04W 56/001
(Continued)

(56) References Cited

U.S. PATENT DOCUMENTS

2014/0010086 A1* 1/2014 Etemad ............. H04W 72/0453
370/235
2014/0044109 A1* 2/2014 Nogami ............. H04W 72/085
370/336
(Continued)

FOREIGN PATENT DOCUMENTS

JP         6168310 B2 *  7/2017   ............. H04L 5/001
WO    2018/008457 A1    1/2018
WO    2018/121495 A1    7/2018

OTHER PUBLICATIONS

Huawei (R1-130514, Jan. 28-Feb. 1, 2013, introduction of S-UMTS) (Year: 2013).*

(Continued)

Primary Examiner — Maharishi V Khirodhar
(74) Attorney, Agent, or Firm — Arent Fox, LLP

(57) ABSTRACT

Aspects are provided in which narrow channels are configured and carrier aggregated with defined channel bandwidths in order to support irregular channel bandwidths that are not a multiple of 5 MHz or other defined bandwidth multiple. An apparatus such as a UE receives, from a base station, a configuration for carrier aggregation for a PCell and one or more SCells. A total bandwidth of the PCell and the one or more SCells is not a defined bandwidth multiple. The apparatus communicates with the base station through the PCell and the one or more SCells. In this way, the available spectrum of wireless operators that include channel bandwidths of irregular size may be supported.

30 Claims, 11 Drawing Sheets

(51) Int. Cl.
  *H04W 24/10* (2009.01)
  *H04W 48/16* (2009.01)
  *H04W 56/00* (2009.01)

(58) Field of Classification Search
  USPC .......................................................... 370/329
  See application file for complete search history.

(56) References Cited

U.S. PATENT DOCUMENTS

| | | | | |
|---|---|---|---|---|
| 2019/0028960 | A1* | 1/2019 | Wong | H04W 72/1231 |
| 2019/0123786 | A1* | 4/2019 | Lee | H04B 1/0067 |
| 2019/0356524 | A1 | 11/2019 | Yi et al. | |
| 2020/0314844 | A1* | 10/2020 | Tomeba | H04W 72/0453 |

OTHER PUBLICATIONS

Samsung (R2-171188, Oct. 9-13, 2017, "Signaling to support bandwidth part"). (Year: 2017).*

International Search Report and Written Opinion dated Dec. 11, 2020 from corresponding PCT Application No. PCT/US2020/052515.

Huawei et al.: 11 Introduction of S-UMTS; 3GPP Draft; R1-130514 Introduction of S-UMTS, 3rd Generation Partnership Project (3GPP), Mobile Competence Centre . 650, Route Des Lucioles. F-06921 Sophia-Antipolis Cedex . France; vol. RAN WG1, No. St Julian; Jan. 28, 2013-Feb. 1, 2013, Jan. 19, 2013 (Jan. 19, 2013), XP050663780, Retrieved from the Internet URL:http://www.3gpp.org/ftp/tsg_ran/WG1_-_RL_1/TSGR1_72/Docs/ [retrieved on Jan. 19, 2013] Section 2.

Samsung: 11 Signaling to support bandwidth part, 3GPP Draft; R2-1711188 Signaling To Support Bandwidth Part R1, 3rd Generation Partnership Project (3GPP), Mobile Competence Centre 350, Route Des Lucioles; F-06921 Sophia-Antipolis Cedex; France; vol. RAN WG2, No. Prague, Czech; Oct. 9, 2017-Oct. 13, 2017, Oct. 8, 2017 (Oct. 8, 2017), XP051343195, Retrieved from the Internet: URL:http://www.3gpp.org/ftp/Meetings_3GPPSYNC/RAN2/Docs/ —[retrieved on Oct. 8, 2017] the whole document.

* cited by examiner

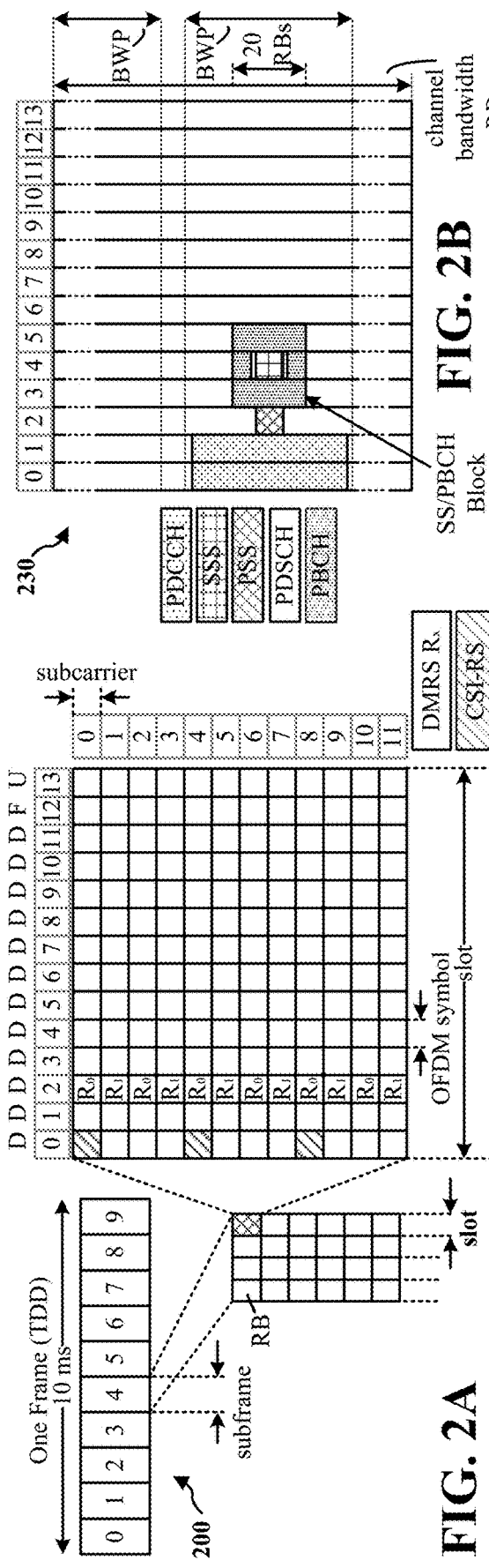
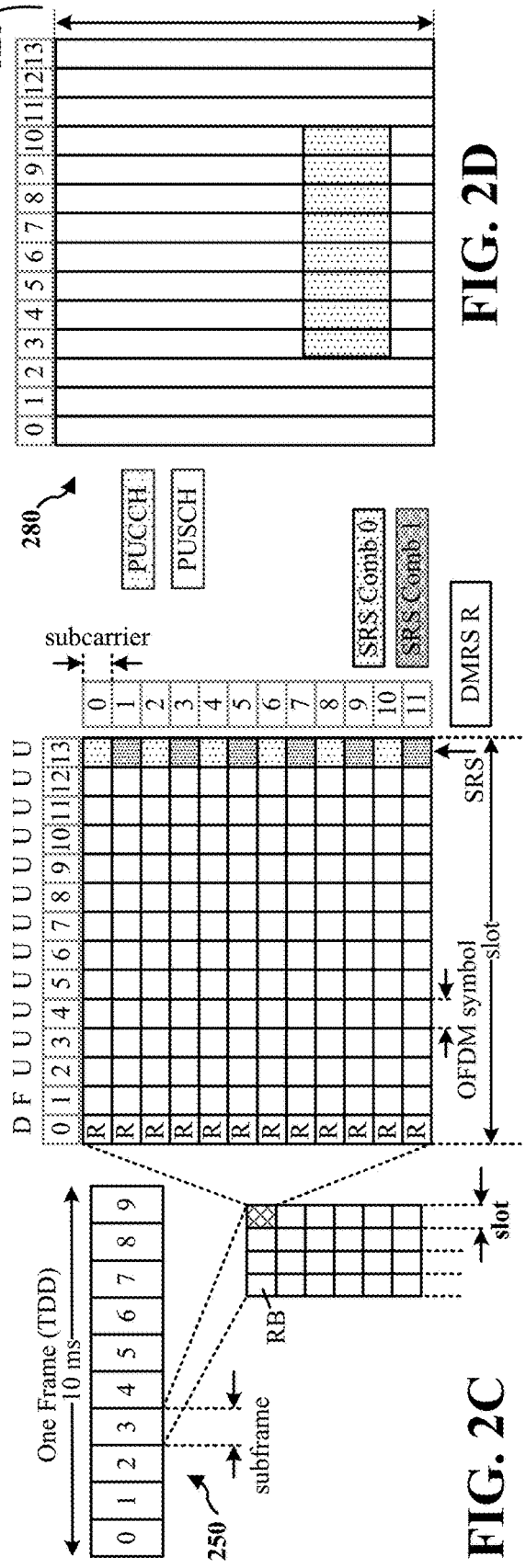
FIG. 2A
FIG. 2B
FIG. 2C
FIG. 2D

FLEXIBLE SPECTRUM USAGE WITH CARRIER AGGREGATION

CROSS REFERENCE TO RELATED APPLICATION(S)

This application claims the benefit of U.S. Provisional Application Ser. No. 62/905,992, entitled "FLEXIBLE SPECTRUM USAGE WITH CARRIER AGGREGATION" and filed on Sep. 25, 2019, which is expressly incorporated by reference herein in its entirety.

BACKGROUND

Technical Field

The present disclosure relates generally to communication systems, and more particularly, to enhanced spectrum usage with carrier aggregation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some wireless operators may have spectrum allocations that are not multiples of 5 MHz (e.g. spectrum allocations of 7 MHz, 13 MHz, etc.), and in some cases not even multiples of 1 MHz (e.g. spectrum allocations of 180 kHz, etc.). This may be due to the wireless operators' use of older systems, such as GSM, that are narrowband based. As such, the spectrum may have been assigned to wireless operators in small allotments over time. Wireless operators want to maximize use of all of their available spectrum, since their spectrum is their most important asset. However, in 5G NR, the channel bandwidths are currently defined as being multiples of 5 MHz (e.g. 5 MHz, 10 MHz, 20 MHz, etc.). While defining the channel bandwidth for all of the possible spectrum allocations, such as 1 MHz increments or smaller, may assist these wireless operators by increasing the number of channel bandwidths (7 MHz, 13 MHz, etc.), such practice may increase the complexity of channel bandwidth testing and/or may be too difficult to support the numerous channel bandwidth possibilities.

To provide a more efficient use of the available spectrum, aspects presented herein allow a base station to configure narrow channels or separate channel bandwidths or bandwidth parts (BWP) that are less than 5 MHz, such as with 1 MHz or 1 resource block (RB) (e.g. 180 kHz) granularity. These narrow channels may be combined with channels of a defined channel bandwidth (e.g. a bandwidth having a multiple of 5 MHz) using carrier aggregation techniques in order to address any possible channel bandwidth used by wireless operators. For example, channels having a 6 MHz, 8 MHz, 12 MHz, or other undefined bandwidth may be operated using carrier aggregation by combining a channel having a defined bandwidth (e.g. a multiple of 5 MHz) with one or more narrow channels (e.g. 180 kHz, 1 MHz, 2 MHz, 3 MHz, etc.). The channel having the defined bandwidth may be used for communication between the base station and a user equipment (UE) in a primary cell (Pcell), and the narrow channel(s) may be used for communication between the base station and the UE in one or more secondary cells (Scell). In this way, channels of irregular size with respect to a defined channel bandwidth may be supported without requiring all possible spectrum allocations to be individually defined. Moreover, the UE may refrain from performing radio resource management (RRM) measurements for these narrow channels and instead use RRM measurements from the aggregated wider channel.

In an aspect of the disclosure, a method, a computer-readable medium, and an apparatus are provided. The apparatus may be a UE. The apparatus receives, from a base station, a configuration for carrier aggregation for a primary cell (PCell) and one or more secondary cells (SCells), where a total bandwidth of the PCell and the one or more SCells is not a defined bandwidth multiple. The apparatus communicates with the base station through the PCell and the one or more SCells.

In an aspect of the disclosure, a method, a computer-readable medium, and an apparatus are provided. The apparatus may be a base station. The apparatus transmits, to a UE, a configuration for carrier aggregation for a PCell and one or more SCells, where a total bandwidth of the PCell and the one or more SCells is not a defined bandwidth multiple. The apparatus communicates with the UE through the PCell and the one or more SCells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
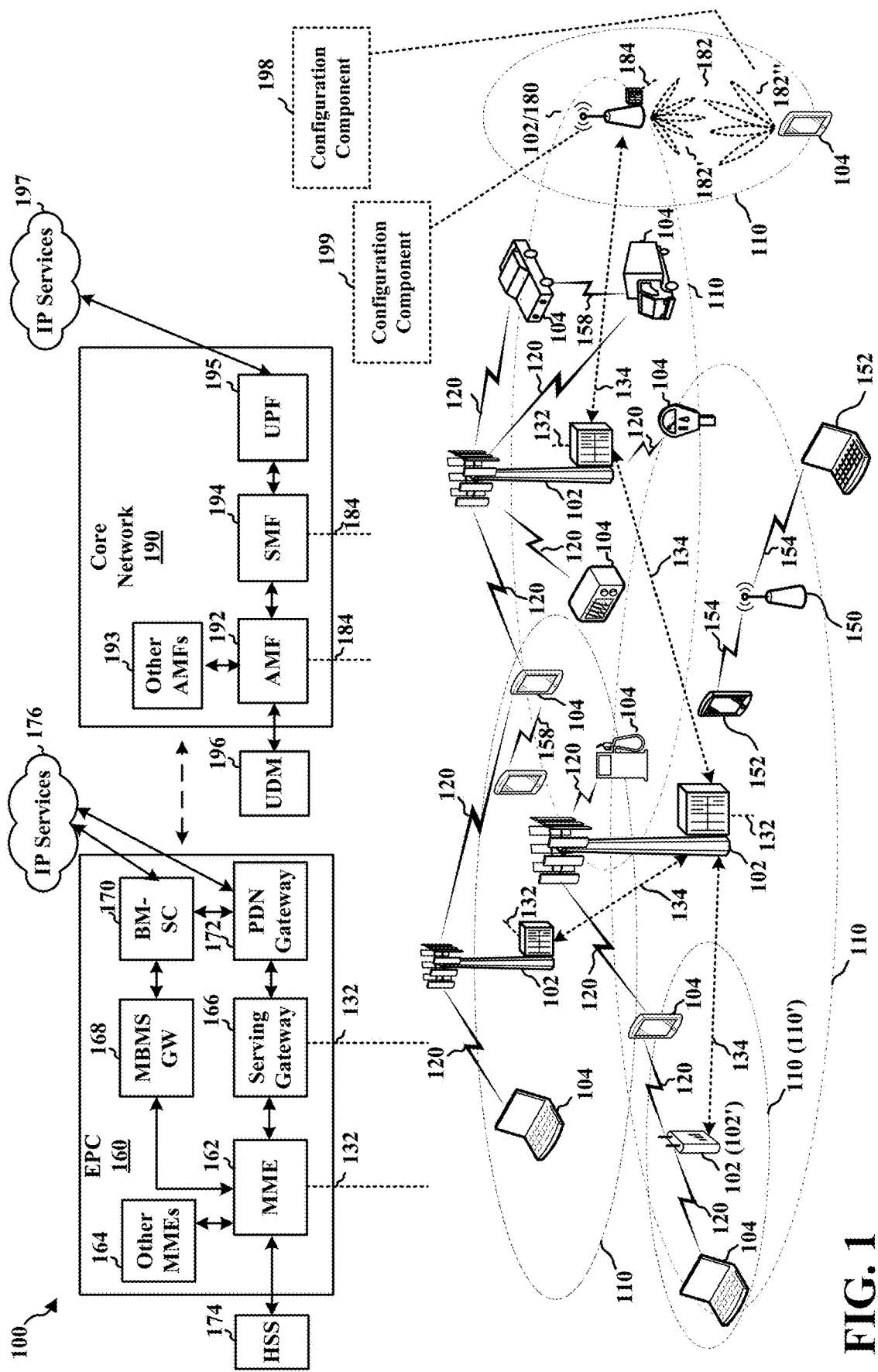
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to utilize carrier aggregation to communicate using channels of irregular size in order to efficiently use the available spectrum. For example, the UE 104 of FIG. 1 may include a configuration component 198 configured to receive, from a base station, a configuration for carrier aggregation for a primary cell (PCell) and one or more secondary cells (SCells), where a total bandwidth of the PCell and the one or more SCells is not a defined bandwidth multiple. The UE 104 may perform radio resource management (RRM) measurements associated with the PCell, where communication through the one or more SCells may be based on the RRM measurements. The configuration component 198 may also be configured to communicate with the base station through the PCell and the one or more SCells. In other aspects, the base station 102/180 of FIG. 1 may include a configuration component 199 configured to transmit, to the UE, a configuration for carrier aggregation for PCell and one or more SCells, where a total bandwidth of the PCell and the one or more SCells is not a defined bandwidth multiple. The configuration component 199 may also be configured to communicate with the UE through the PCell and the one or more SCells.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
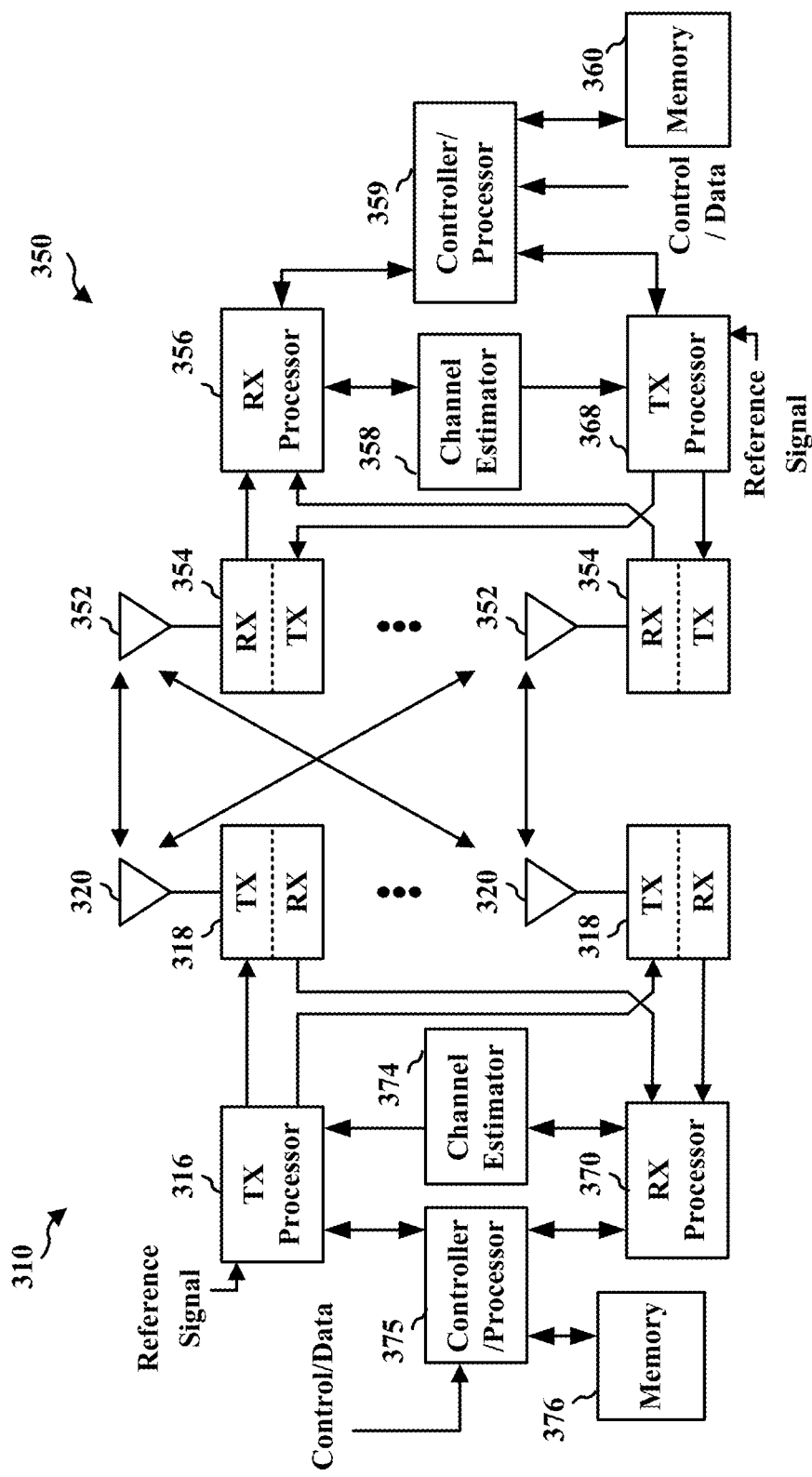
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with configuration component 198 of FIG. 1.

At least one of the TX processor 316, the RX processor 370, and the controller/processor 375 may be configured to perform aspects in connection with configuration component 199 of FIG. 1.

In wireless communications, base stations and a UE may send different notifications and paging signals to each other in order to facilitate communication. These signals can help to improve the overall communication as well as the access and control of each device within the wireless system.

Some wireless operators may have spectrum allocations that are not multiples of 5 MHz (e.g. spectrum allocations of 7 MHz, 13 MHz, etc.), and sometimes not even multiples of 1 MHz (e.g. spectrum allocations of 180 kHz, etc.). This may be due to the wireless operators' use of older systems, such as GSM, that are narrowband based. As such, the spectrum may have been assigned to wireless operators in small allotments over time. Wireless operators want to maximize use of all of their available spectrum, since their spectrum is their most important asset. However, in 5G NR, the channel bandwidths are currently defined as being multiples of 5 MHz. For example, defined bandwidth multiples for 5G NR may include 5 MHz, 10 MHz, 15 MHz, 20 MHz, 25 MHz, 30 MHz, 40 MHz, 50 MHz, 60 MHz, 70 MHz, 80 MHz, 90 MHz, and 100 MHz. Defining the channel bandwidth for all of the possible spectrum allocations, such as 1 MHz increments or smaller, may increase the number of channel bandwidths, but may increase complexity and/or may be too difficult to support.

Defining narrow channel bandwidths, such as 1 MHz increments, would allow for these channels to be aggregated with channels that are configured as a multiple of 5 MHz. For example, a 6 MHz channel may be defined by a 5 MHz channel aggregated with a 1 MHz channel. The 1 MHz channel is a narrow channel that is less than the 5 MHz channel and multiple narrow channels may be aggregated with the multiple of 5 MHz channel to form various channels. For instance, a 8 MHz channel may result from the aggregation of a 5 MHz channel and one 3 MHz narrow channel, a 5 MHz channel and three 1 MHz narrow channels, or a 5 MHz channel and one 2 MHz and 1 MHz narrow channel. Similarly, a 12 MHz channel may result from the aggregation of a 10 MHz channel and one 2 MHz narrow channel, or a 10 MHz channel and two 1 MHz narrow channels. Other undefined channel bandwidths that are not a multiple of 5 MHz may be similarly aggregated using one or more defined channel bandwidths that are a multiple of 5 MHz with one or more narrow channel bandwidths that are less than 5 MHz. In this way, various channels may be supported without requiring all possible spectrum allocations to be individually defined.

Moreover, each channel bandwidth generally comes with its own definition of emissions (i.e. a spectrum emission mask (SEM)). For example, each defined bandwidth in NR (e.g. 5 MHz, 10 MHz, 15 MHz, etc.) may include defined sets of spectrum emission limits for various frequency offsets ($\Delta f_{OOB}$). Therefore, if a channel bandwidth was to be individually defined for all possible spectrum allocations (e.g. 7 MHz, 13 MHz, etc.), the SEM would have to be significantly modified to accommodate all of these possible bandwidths, which may be unwieldy and impractical. Accordingly, by defining narrow channel bandwidths (e.g. 180 kHz, 1 MHz, 2 MHz, etc.) and carrier aggregating them with the defined channel bandwidths (e.g. 5 MHz, 10 MHz, etc.) to arrive at the different bandwidth possibilities (e.g. 7 MHz, 13 MHz, etc.), less modifications of the SEM would be required. For instance, only the defined narrow bandwidths less than 5 MHz would need to be added to the SEM.

In systems that utilize carrier aggregation, a UE may be configured to communicate with the network via a base station utilizing a primary cell (PCell) and a secondary cell (Scell). Carrier aggregation may allow a UE to transmit and receive data, simultaneously, on multiple component carriers from a single base station. In some aspects, the Pcell may correspond to a first base station and the Scell may correspond to a second base station. Pcells and Scells may carry very different types of traffic. A Pcell may always be activated and may be configured to have wide coverage area. For example, a Pcell (e.g., Pcell 410) may be generally used for scheduling and other control procedures, as well as applications (e.g., voice) that require carriers that provide more on coverage than throughput. An Scell (e.g., Scell1 420, Scell2 430, or Scell3 440) may be activated to help offload bursts of traffic from the Pcell 410, as well as be used for applications (e.g., video/data streaming) that prefer to use high bandwidth carriers. Voice and data streaming have very different traffic profiles, in terms of duration of data bursts and idle time between data bursts.

Figure 4:
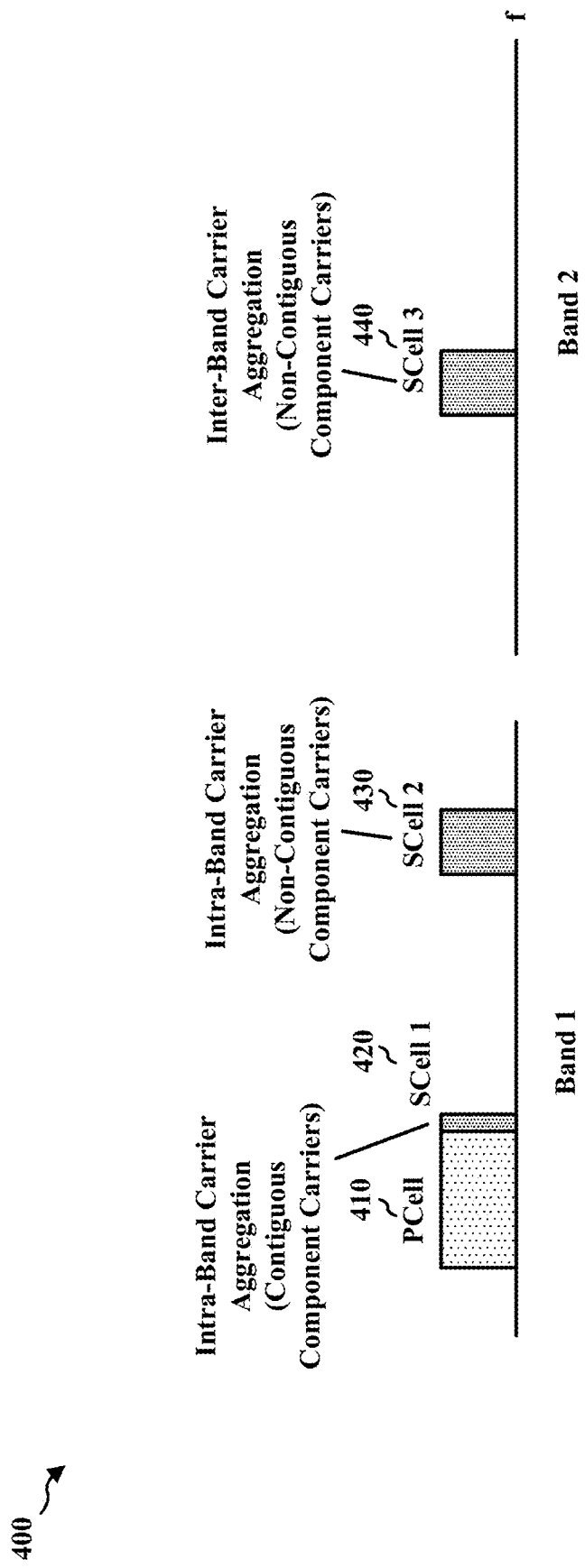
FIG. 4 is a diagram illustrating an example of carrier aggregation in accordance with certain aspects of the disclosure.

In carrier aggregation, the carriers may be aggregated in the same band or across different bands, as shown in FIG. 4. The diagram 400 of FIG. 4 shows an example of carriers aggregated in the same band known as intra-band, contiguous (e.g., Pcell 410 and Scell1 420) or intra-band, non-contiguous (e.g., Pcell 410 and Scell2 430). In these arrangements, the carriers are within the same band and the aggregated carriers are either adjacent each other (e.g., intra-band contiguous, Pcell 410 and Scell1 420) or the carriers are not adjacent each other such that there is some frequency spacing separating the carriers (e.g., intra-band non-contiguous, Pcell 410 and Scell2 430). In inter-band non-contiguous, the carriers belong to different operating frequency bands. For example, a Pcell (e.g., Pcell 410) may be on a sub 6 GHz carrier (e.g., FR1) and an Scell (e.g., Scell3 440) may be on a high-frequency carrier (e.g., mmW, FR2). In inter-band non-contiguous, the PCell (e.g., PCell 410) and the SCell (e.g., SCell3 440) may provide different coverage areas due to the PCell and SCell operating on different frequency bands, e.g., sub 6 GHz carriers and mmW, respectively. In some aspects, the coverage provided by the PCell may be greater than the coverage provided by the SCell, which may be due, in part, to the different frequency bands.

In some aspects, the narrow channels may not include a synchronization signal block (SSB), and thus these channels may only be used for communication in an SCell. For example, SSBs may require at least 4 MHz of bandwidth, and thus the base station may select to transmit SSBs only in wider channels (e.g. 5 MHz or larger bandwidth). As a result, these narrow channels may not be used for a PCell, but may be used for SCells. In some aspects, the aggregation of the narrow channels may be intra-band contiguous, such that the UE may not have to perform mobility measurements or any radio link monitoring on the narrow channels. The narrow channels may use the measurements and the procedures defined for the 5 MHz multiple channel (or wider channel). In some aspects, the narrow channels may not have sufficient space to include reference signals or synchronization signals that may be used to conduct such measurements. As such, packaging the narrow channel with the 5 MHz multiple channel (e.g., wider channel) may allow for efficient use of the available spectrum, such that minimal or a reduced amount of unused spectrum occurs.

Figure 5:
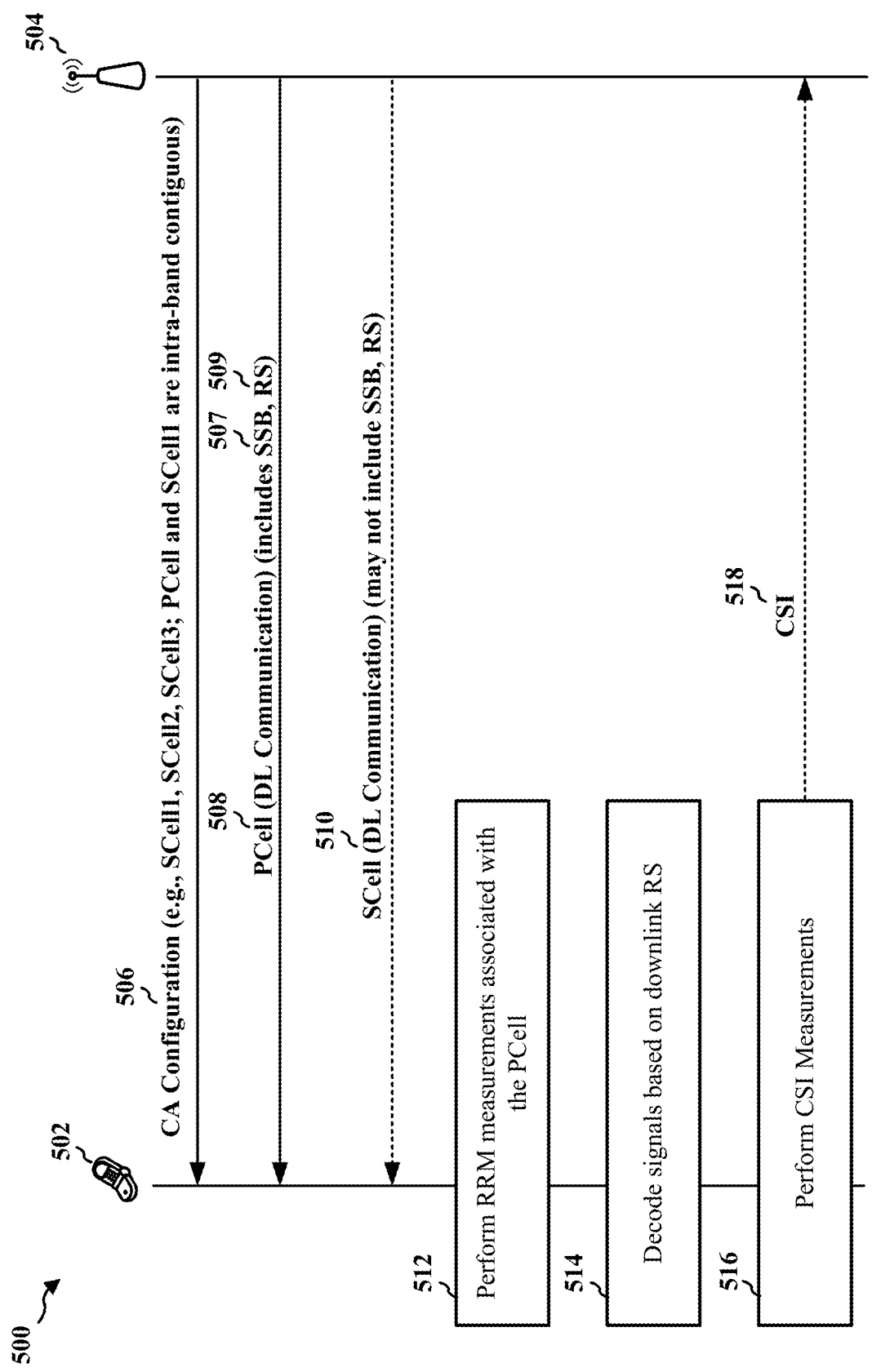
FIG. 5 is a call flow diagram of signaling between a UE and a base station in accordance with certain aspects of the disclosure.

FIG. 5 illustrates an example communication flow 500 between a UE 502 and a base station 504. The base station 504 may be configured to provide a cell. For example, in the context of FIG. 1, the base station 504 may correspond to base station 102/180 and, accordingly, the cell may include a geographic coverage area 110 in which communication coverage is provided and/or small cell 102' having a coverage area 110'. Further, the UE 502 may correspond to at least UE 104. In another example, in the context of FIG. 3, the base station 504 may correspond to the base station 310 and the UE 502 may correspond to the UE 350.

The base station 504 may transmit a carrier aggregation configuration 506 in order for the UE 502 to maximize use of the available spectrum when communicating across different serving cells (e.g., PCell and SCell). The base station 504 may be configured to support carrier aggregation such that the UE 502 may communicate with the base station 504 via a PCell and an SCell in accordance with the diagram 400 of FIG. 4.

The UE 502 may receive, from the base station 504, the carrier aggregation configuration 506. The carrier aggregation configuration 506 may be associated with a PCell 508 (e.g., PCell 410) and one or more SCells 510 (e.g., SCell1 420, SCell2 430, SCell3 440). In some aspects, the carrier aggregation configuration 506 may be associated with a PCell (e.g., PCell 410) and an SCell (e.g., SCell1 420) that are arranged in an intra-band contiguous carrier aggregation. As such, the PCell (e.g., PCell 410) and SCell (e.g., SCell1 420) may be adjacent channels. In some aspects, the PCell may include a synchronization signal block 507 (SSB) and at least one SCell of the one or more SCells may not include an SSB. In some aspects, at least one SCell of the one or more SCells may be configured without an SSB. Accordingly, the UE may not perform mobility measurements or any radio link monitoring on the at least one SCell, and may utilize the measurements and procedures defined for the PCell, when receiving and transmitting data on the one or more SCells. The at least one SCell may be configured in such a manner as to not have sufficient space for reference or synchronization signals associated with mobility measurements and/or radio link monitoring. The lack of such reference or synchronization signals may allow for the at least one SCell to be a narrow channel and allow for efficient usage of the available spectrum. The at least one SCell being a narrow channel may be aggregated with a wider channel (e.g., multiple of 5 MHz channel) to form an irregular size channel (e.g., 6 MHz, 8 MHz, 13 MHz, or the like). Thus, the total bandwidth of the PCell and the one or more SCells may not be a multiple of 5 MHz or some other defined multiple.

Upon receipt of the carrier aggregation configuration 506, the UE may be configured to communicate with the base station 504 through the PCell 508 and the one or more SCells 510. The PCell 508 may include the SSB 507 to establish communication with the base station 504. The PCell 508 may also include reference signals 509 (RS). In some aspects, the reference signals 509 may be sent on the PCell and not on the at least one SCell. The UE 502 may receive the SSB 507 and RS 509 in a downlink communication from the base station 504. The SCell 510 may not include an SSB or RS, as discussed above, such that the UE may use the measurements and procedures defined for the PCell 508 for the SCell 510. In some aspects, each of the one or more SCells may not include an SSB. In some aspects, the at least one SCell may have a bandwidth less than 5 MHz and contain between 1 RB and 27 RBs. In some aspects, the at least one SCell may have a bandwidth less than 1.4 MHz and contain between 1 RB and 7 RBs. In some aspects, the at least one SCell may have a bandwidth less than or equal to 1 MHz and contain between 1 RB and 5 RBs. In some aspects, the at least one SCell may have a bandwidth equal to 180 kHz and contain 1 RB. The carrier aggregation of the PCell and the one or more SCells may allow for irregular channels (e.g., 6 MHz, 8 MHz, 13 MHz, or the like). The at least one SCell and the PCell may be contiguous in frequency, such that the at least one SCell and the PCell are adjacent channels.

In some aspects, for example at 512, the UE 502 may be configured to perform radio resource management (RRM) measurements associated with the PCell 508. The communication through the at least one SCell 510 may be based on the RRM measurements. In some aspects, the RRM measurements may include at least one of a channel quality indicator (CQI), a reference signal received power (RSRP), a reference signal reserved quality (RSRQ), a carrier received signal strength indicator (RSSI), a signal to noise ratio (SNR), or a signal to interference plus noise ratio (SINR).

In some aspects, for example at 514, the UE 502 may be configured to decode signals received via the PCell 508 and the at least one SCell 510 based on downlink RS (e.g. RS 509). In some aspects, for example at 516, the UE 502 may perform channel state information (CSI) measurements corresponding to the PCell. The UE 502 may report CSI 518 to the base station 504 in response to the CSI measurements. In some aspects, the CSI measurements may be based on the reference signal or the SSB. The base station may adjust transmissions on the PCell and the at least one SCell based on the received CSI measurements, when communicating with the UE through the PCell and the one or more SCells. In some aspects, the at least one SCell 510 may not include RS, such that the communication with the at least one SCell 510 may be based on the RS measured or received within the PCell 508.

Figure 6:
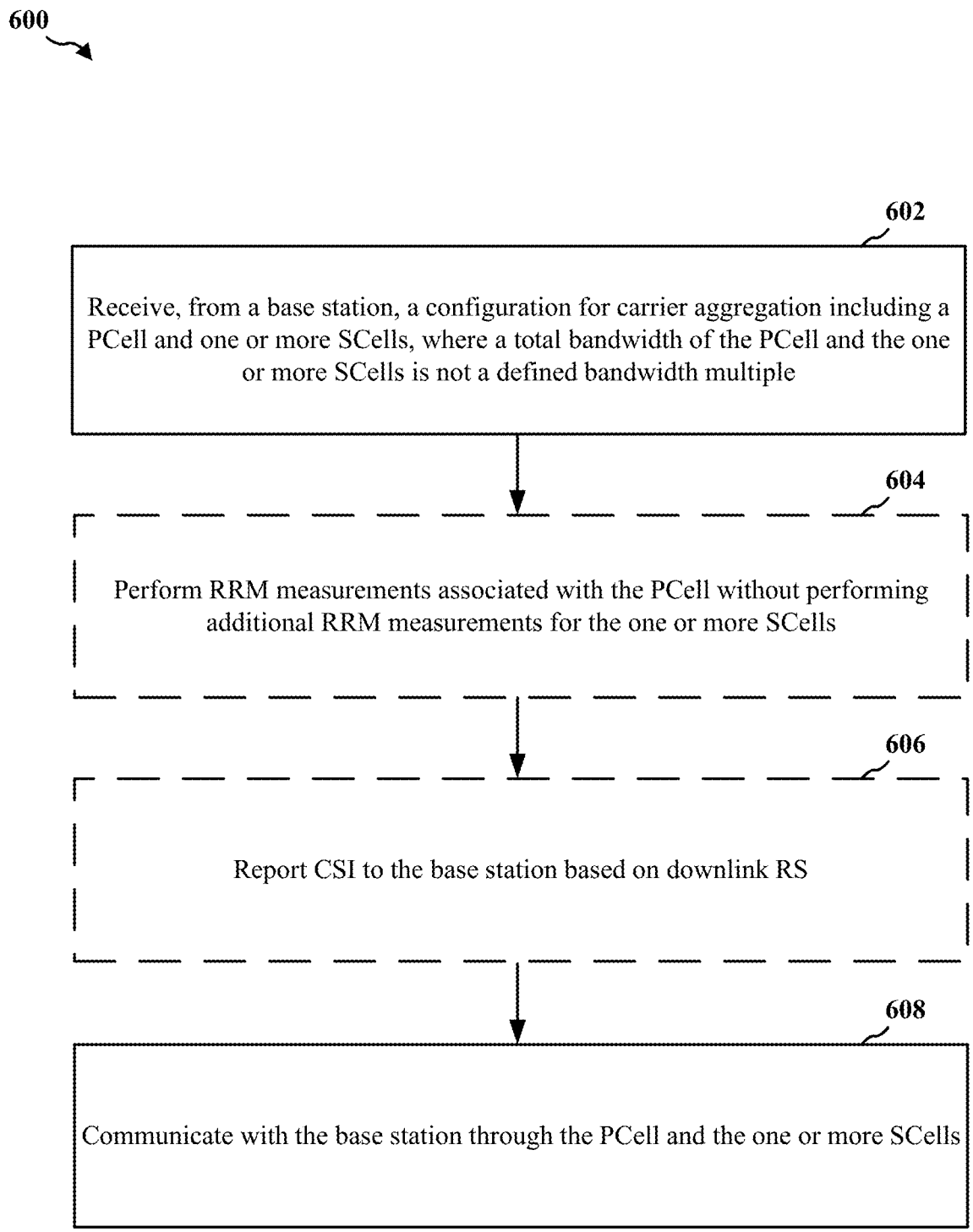
FIG. 6 is a flowchart of a method of wireless communication.

FIG. 6 is a flowchart 600 of a method of wireless communication. The method may be performed by a UE or a component of a UE (e.g., the UE 104, 350, 502; the apparatus 702/702'; the processing system 814, which may include the memory 360 and which may be the entire UE 350 or a component of the UE 350, such as the TX processor 368, the RX processor 356, and/or the controller/processor 359). According to various aspects, one or more of the illustrated operations of the method 600 may be omitted, transposed, and/or contemporaneously performed. Optional aspects are illustrated with a dashed line. The method may enable a UE to utilize carrier aggregation to communicate using channels of irregular size in order to efficiently use the available spectrum.

At 602, the UE may receive, from a base station, a configuration for carrier aggregation. For example, 602 may be performed by configuration component 706 of apparatus 702. For instance, referring to FIGS. 4 and 5, the carrier aggregation configuration 506 may be associated with a PCell 410, 508 and one or more SCells 420, 430, 440, 510. A total bandwidth of the PCell and the one or more SCells may not be a defined bandwidth multiple (e.g. for NR). For example, the defined bandwidth multiple may be one of 5 MHz, 10 MHz, 15 MHz, 20 MHz, 25 MHz, 30 MHz, 40 MHz, 50 MHz, 60 MHz, 70 MHz, 80 MHz, 90 MHz, 100 MHz, or other defined bandwidth multiples of 5 MHz for NR, and the total bandwidth of the PCell and the one or more SCells may not be any of these defined bandwidths. In some aspects, at least one SCell of the one or more SCells may not include a synchronization signal block (SSB). In some aspects, each of the one or more SCells may not include an SSB. In some aspects, at least one SCell may have a bandwidth less than the defined bandwidth multiple. For example, if the defined bandwidth multiple is 5 MHz, the at least one SCell may contain between 1 resource block (RB) and 27 RBs. In some aspects, at least one SCell may have a bandwidth of less than 1.4 MHz, and contain between 1 RB and 7 RBs. In some aspects, at least one SCell may have a bandwidth of less than or equal to 1 MHz, and contain between 1 RB and 5 RBs. In some aspects, at least one SCell may have a bandwidth of 180 kHz and contain one resource block (RB). In some aspects, at least one SCell and the PCell may be contiguous in frequency.

At 604, the UE may perform radio resource management (RRM) measurements associated with the PCell without performing additional RRM measurements for the one or more SCells. For example, 604 may be performed by measurement component 708 of apparatus 702. For instance, referring to FIG. 5, the UE 502 may perform RRM measurements associated with the PCell 508 at 512, and the UE 502 may not perform mobility measurements or any radio link monitoring on the at least one SCell, instead utilizing the measurements and procedures defined for the PCell when receiving and transmitting data on the one or more SCells. The RRM measurements may include at least one of a channel quality indicator (CQI), a reference signal received power (RSRP), a reference signal reserved quality (RSRQ), a carrier received signal strength indicator (RSSI), a signal to noise ratio (SNR), or a signal to interference plus noise ratio (SINR).

At 606, the UE may report channel state information (CSI) to the base station. For example, 606 may be performed by CSI component 710 of apparatus 702. For instance, referring to FIG. 5, the UE 502 may send CSI measurements (e.g. CSI 518) to the base station 504 based on downlink reference signals (e.g. RS 509) received from the base station. The UE may perform CSI measurements corresponding to the PCell, for example, at 516. The UE may report the CSI 518 to the base station in response to the CSI measurements. In some aspects, the one or more SCells may not include RS, and the communication with the one or more SCells may be based on RS measured or received within the PCell. In some aspects, the communication through at least one SCell may be based on the RRM measurements associated with the PCell.

At 608, the UE may communicate with the base station. For example, 608 may be performed by communication component 712 of apparatus 702. For instance, referring to FIG. 5, the UE 502 may communicate with the base station 504 through the PCell 508 and the one or more SCells 510, e.g. by receiving downlink data or control information and by transmitting uplink data or control information. Communication with the base station may include decoding data/control information from the base station (for example, at 514).

Figure 7:
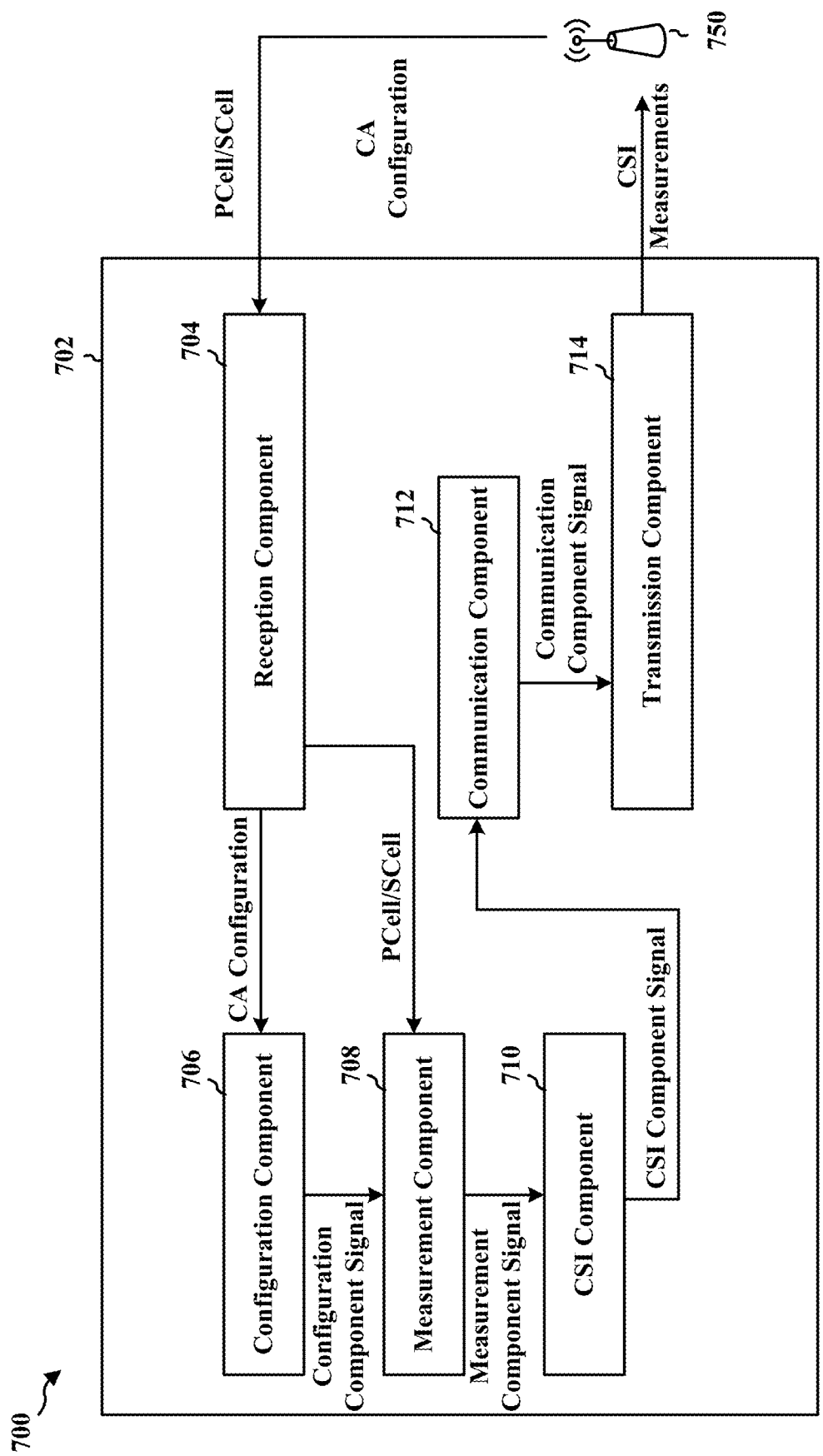
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE or a component of a UE. The apparatus includes a reception component 704 that may be configured to receive various types of signals/messages and/or other information from other devices, including, for example, the base station 750. The apparatus includes a configuration component 706 that may receive, from a base station, a configuration for carrier aggregation, e.g., as described in connection with 602 of FIG. 6. The apparatus includes a measurement component 708 that may perform RRM measurements associated with the PCell without performing additional RRM measurements for the one or more SCells, e.g., as described in connection with 604 of FIG. 6. The apparatus includes a CSI component 710 that may send CSI measurements to the base station based on the RS, e.g., as described in connection with 606 of FIG. 6. The apparatus includes a communication component 712 that may communicate with the base station through the PCell and the one or more SCells, e.g., as described in connection with 608 of FIG. 6. The apparatus includes a transmission component 714 that may be configured to transmit various types of signals/messages and/or other information to other devices, including, for example, the base station 750.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
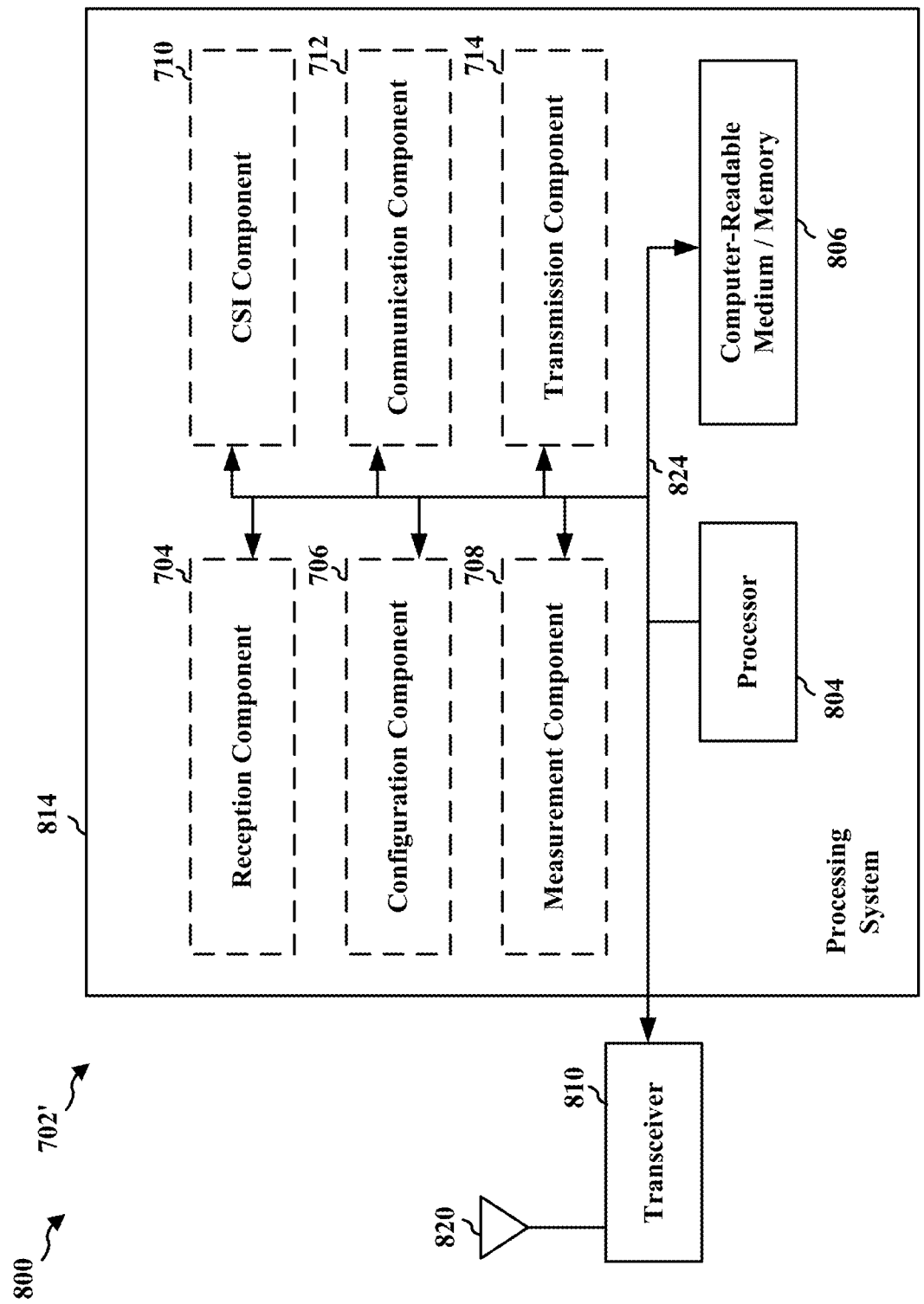
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 714, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for receiving, from a base station, a configuration for carrier aggregation for a primary cell PCell and one or more SCells. A total bandwidth of the PCell and the one or more Scells is not a defined bandwidth multiple. The apparatus also includes means for communicating with the base station through the PCell and the one or more SCells. In one configuration, the apparatus may further include means for performing RRM measurements associated with the PCell without performing additional RRM measurements for the one or more SCells. In one configuration, the apparatus may further include means for sending CSI measurements to the base station based on the RS signals. The communicating through the one or more SCells may be based on the RRM measurements associated with the PCell. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
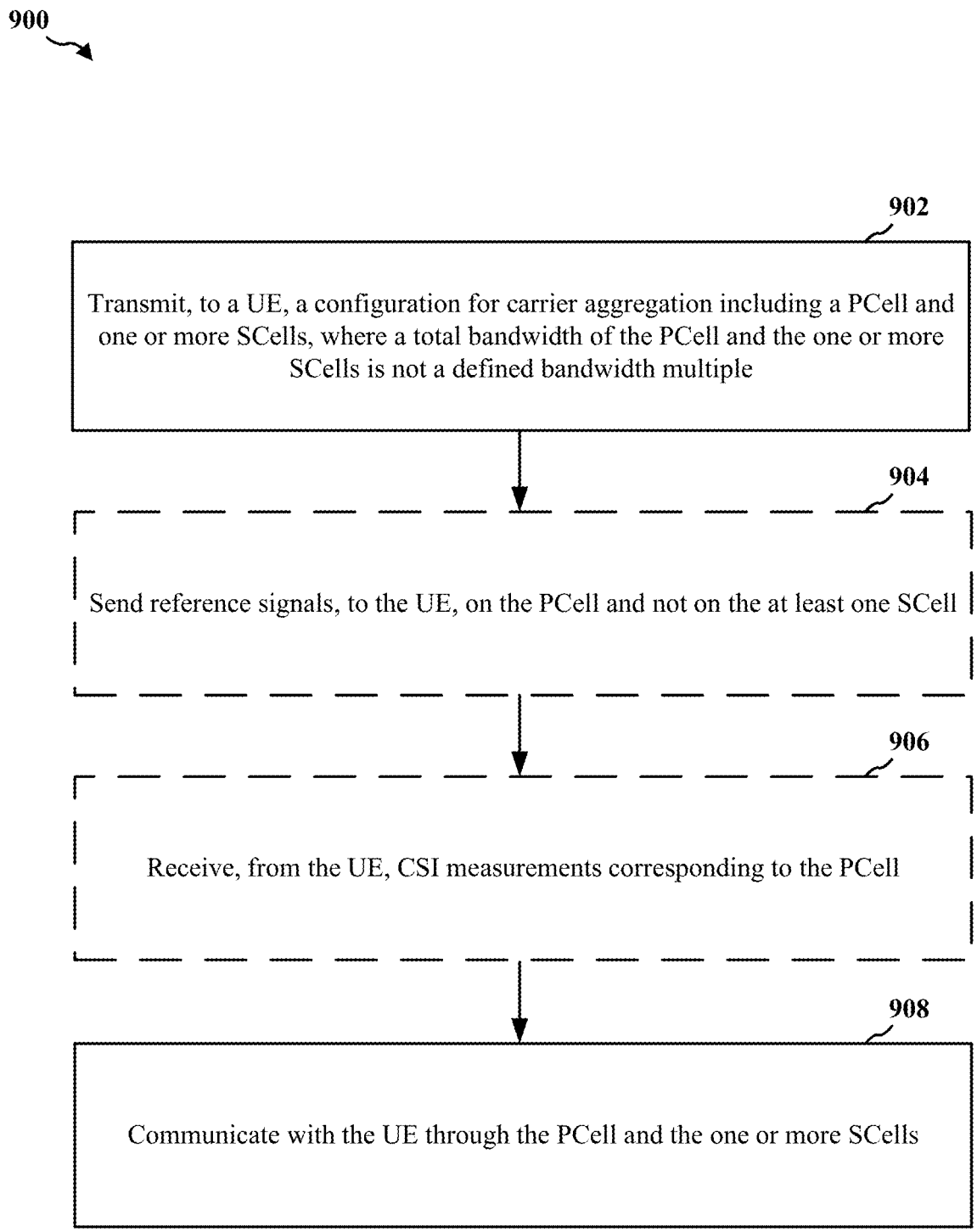
FIG. 9 is a flowchart of a method of wireless communication.

FIG. 9 is a flowchart 900 of a method of wireless communication. The method may be performed by a base station or a component of a base station (e.g., the base station 102, 180, 310, 504, 750; the apparatus 1002/1002'; the processing system 1114, which may include the memory 376 and which may be the entire base station 310 or a component of the base station 310, such as the TX processor 316, the RX processor 370, and/or the controller/processor 375). According to various aspects, one or more of the illustrated operations of the method 900 may be omitted, transposed, and/or contemporaneously performed. Optional aspects are illustrated with a dashed line. The method may enable a base station to provide a carrier aggregation configuration to a UE to utilize carrier aggregation to communicate using channels of irregular size in order to efficiently use the available spectrum.

At 902, the base station may transmit, to a UE, a configuration for carrier aggregation. For example, 902 may be performed by configuration component 1006 of apparatus 1002. For instance, referring to FIGS. 4 and 5, the configuration 506 for carrier aggregation may be associated with a PCell 410, 508 and one or more SCells 420, 430, 440, 510. A total bandwidth of the PCell and the one or more Scells may not be a defined bandwidth multiple (e.g. for NR). For example, the defined bandwidth multiple may be one of 5 MHz, 10 MHz, 15 MHz, 20 MHz, 25 MHz, 30 MHz, 40 MHz, 50 MHz, 60 MHz, 70 MHz, 80 MHz, 90 MHz, 100 MHz, or other defined bandwidth multiples of 5 MHz for NR, and the total bandwidth of the PCell and the one or more SCells may not be any of these defined bandwidths. In some aspects, the Pcell may include an SSB (e.g. SSB 507) and at least one Scell of the one or more Scells may not include an SSB. In some aspects, each of the one or more Scells may not include an SSB. In some aspects, the one or more Scells and the Pcell are contiguous in frequency.

At 904, the base station may send reference signals to the UE. For example, 904 may be performed by RS component 1008 of apparatus 1002. For instance, referring to FIG. 5, the base station 504 may send reference signals (RS 509) to the UE 502 on the PCell 508 and not on the one or more SCells 510.

At 906, the base station may receive, from the UE, CSI measurements corresponding to the PCell. For example, 906 may be performed by CSI component 1010 of apparatus 1002. For instance, referring to FIG. 5, the base station 504 may receive CSI 518 from the UE 502 corresponding to the Pcell 508. In some aspects, the base station may receive CSI measurements, from the UE, corresponding to the PCell based on the reference signals (e.g. RS 509) or based on the SSB (e.g. SSB 507).

At 908, the base station may communicate with the UE through the PCell and the one or more SCells. For example, 908 may be performed by communication component 1012 of apparatus 1002. For instance, referring to FIG. 5, the base station 504 may communicate with the UE 502 through the Pcell 508 and the one or more Scells 510, e.g., by transmitting downlink data or control information and by receiving uplink data or control information. In some aspects, the base station may communicate with the UE by adjusting transmissions on the PCell and the one or more SCells based on the received CSI measurements (e.g. CSI 518).

Figure 10:
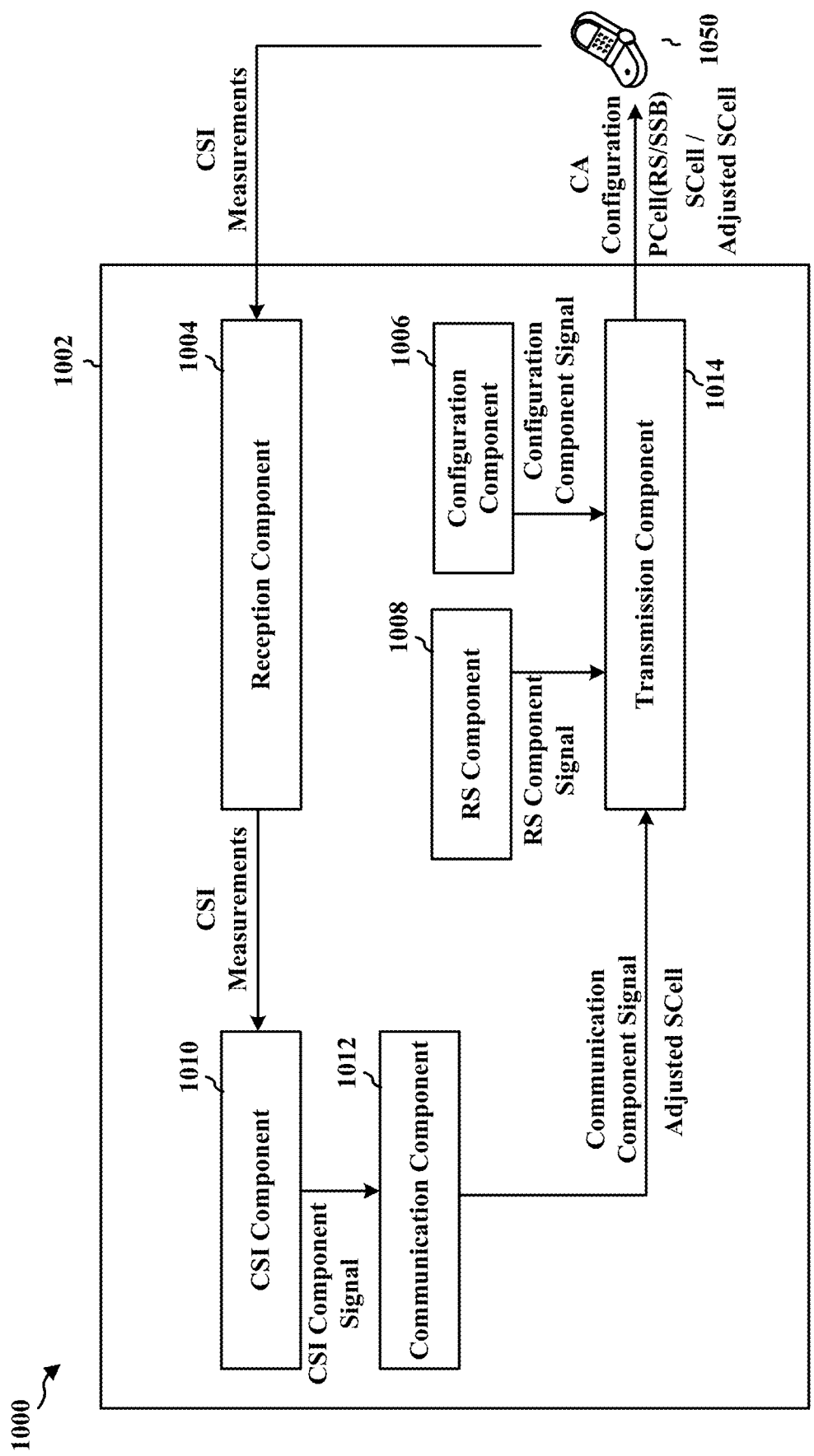
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a base station or a component of a base station. The apparatus includes a reception component 1004 that may be configured to receive various types of signals/messages and/or other information from other device, including, for example, the UE 1050. The apparatus includes a configuration component 1006 that may transmit, to a UE, a configuration for carrier aggregation, e.g., as described in connection with 902 of FIG. 9. The apparatus includes an RS component 1008 that may send reference signals, to the UE, on the PCell and not on the one or more SCells, e.g., as described in connection with 904 of FIG. 9. The apparatus includes a CSI component 1010 that may receive, from the UE, CSI measurements corresponding to the PCell, e.g., as described in connection with 906 of FIG. 9. The apparatus includes a communication component 1012 that may communicate with the UE through the PCell and the one or more SCells, e.g., as described in connection with 908 of FIG. 9. The apparatus includes a transmission component 1014 that may be configured to transmit various types of signals/messages and/or other information to other devices, including, for example, the UE 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
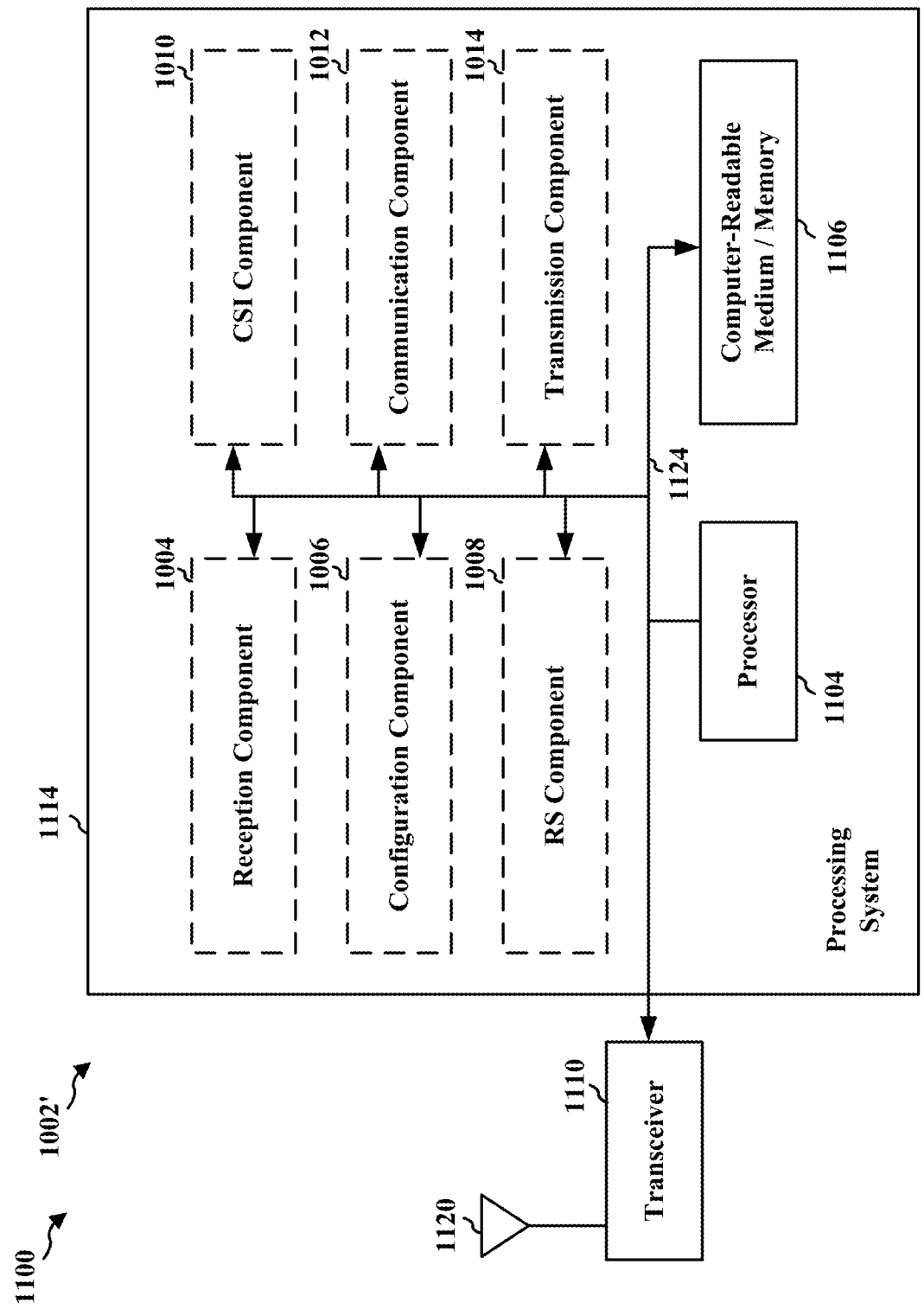
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for transmitting, to a UE, a configuration for carrier aggregation for a PCell and one or more SCells. A total bandwidth of the PCell and the one or more SCells is not a defined bandwidth multiple. The apparatus also includes means for communicating with the UE through the PCell and the one or more SCells. In one configuration, the apparatus may further include means for sending reference signals, to the UE, on the PCell and not on the one or more SCells. In one configuration, the apparatus may further include means for receiving, from the UE, CSI measurements corresponding to the PCell. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects of the present disclosure relate to configuring narrow channels or separate channel bandwidths or BWPs that are less than 5 MHz (such as with 1 MHz or 1 RB granularity), and using carrier aggregation techniques in order to provide an efficient use of the available spectrum to wireless operators. Channel bandwidths, in 5G NR, are currently defined in multiples of 5 MHz. However, some wireless operators may have spectrum allocations that are not multiples of 5 MHz. Wireless operators want to maximize use of all of their available spectrum, since their spectrum is their most important asset. Accordingly, separate channel bandwidths may be configured and aggregated using carrier aggregation to provide support in NR for channels of irregular size (e.g. that are not multiples of 5 MHz). In some aspects, a UE may receive, from a base station, a configuration for carrier aggregation for a PCell and one or more SCells, where a total bandwidth of the PCell and the one or more SCells is not a multiple of 5 MHz or other defined bandwidth. The UE may communicate with the base station through the PCell and the one or more SCells. In this way, channels of irregular size may be supported without requiring all possible spectrum allocations to be individually defined. Moreover, in some aspects, at least one Scell of the one or more Scells may not include an SSB. At least one advantage of the disclosure is that the at least one SCell not having an SSB eliminates the need for the UE to conduct any mobility measurements or radio link measurements on the at least one SCell. As such, the UE may operate on the SCell using all the procedures defined for the PCell. The at least one SCell may be aggregated with a channel that is a multiple of 5 MHz to form an irregular size channel (e.g., 6 MHz, 8 MHz, 13 MHz, or the like) which may allow for efficient use of the available spectrum.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving, from a base station, a configuration for carrier aggregation for a primary cell (PCell) and one or more secondary cells (SCells), wherein a total bandwidth of the PCell and the one or more SCells is not a defined bandwidth multiple; and communicating with the base station through the PCell and the one or more SCells.

Example 2 is the method of Example 1, wherein each of the one or more SCells do not include a synchronization signal block (SSB).

Example 3 is the method of Examples 1 and 2, wherein the at least one SCell has a bandwidth less than the defined bandwidth multiple.

Example 4 is the method of any of Examples 1 to 3, wherein the at least one SCell has a bandwidth of less than 1.4 MHz.

Example 5 is the method of any of Examples 1 to 4, wherein the at least one SCell has a bandwidth of less than 1 MHz.

Example 6 is the method of any of Examples 1 to 5, wherein the at least one SCell has a bandwidth of 180 kHz.

Example 7 is the method of any of Examples 1 to 6, wherein the at least one SCell and the PCell are contiguous in frequency.

Example 8 is the method of any of Examples 1 to 7, further comprising: performing radio resource management (RRM) measurements associated with the PCell without performing additional RRM measurements for the one or more SCells.

Example 9 is the method of any of Examples 1 to 8, further comprising: sending channel state information (CSI) measurements to the base station based on reference signals (RS), wherein the communicating through the one or more SCells is based on the RRM measurements associated with the PCell.

Example 10 is the method of any of Examples 1 to 9, wherein the one or more Scells do not include the RS, and the communicating with the one or more SCells is based on the RS measured or received within the PCell.

Example 11 is the method of any of Examples 1 to 10, wherein the defined bandwidth multiple is one of 5 MHz, 10 MHz, 15 MHz, 20 MHz, 25 MHz, 30 MHz, 40 MHz, 50 MHz, 60 MHz, 70 MHz, 80 MHz, 90 MHz, or 100 MHz.

Example 12 is an apparatus for wireless communication, comprising: a memory; and at least one processor coupled to the memory and configured to: receive, from a base station, a configuration for carrier aggregation for a primary cell (PCell) and one or more secondary cells (SCells), wherein a total bandwidth of the PCell and the one or more SCells is not a defined bandwidth multiple; and communicate with the base station through the PCell and the one or more SCells.

Example 13 is the apparatus of Example 12, wherein each of the one or more SCells do not include a synchronization signal block (SSB).

Example 14 is the apparatus of Examples 12 and 13, wherein the one or more SCells and the PCell are contiguous in frequency.

Example 15 is the apparatus of any of Examples 12 to 14, wherein the at least one processor is further configured to: perform radio resource management (RRM) measurements associated with the PCell without performing additional RRM measurements for the one or more SCells.

Example 16 is the apparatus of any of Examples 12 to 15, wherein the at least one processor is further configured to: send channel state information (CSI) measurements to the base station based on reference signals (RS), wherein the at least one processor is further configured to communicate through the one or more SCells based on the RRM measurements associated with the PCell.

Example 17 is the apparatus of any of Examples 12 to 16, wherein the one or more SCells do not include the RS, and the communication with the at least one SCell is based on the RS measured or received within the PCell.

Example 18 is the apparatus of any of Examples 12 to 17, wherein the defined bandwidth multiple is one of 5 MHz, 10 MHz, 15 MHz, 20 MHz, 25 MHz, 30 MHz, 40 MHz, 50 MHz, 60 MHz, 70 MHz, 80 MHz, 90 MHz, or 100 MHz.

Example 19 is a method of wireless communication at a base station, comprising: transmitting, to a user equipment (UE), a configuration for carrier aggregation for a primary cell (PCell) and one or more secondary cells (SCells), wherein a total bandwidth of the PCell and the one or more SCells is not a defined bandwidth multiple; and communicating with the UE through the PCell and the one or more SCells.

Example 20 is the method of Example 19, wherein the PCell includes a synchronization signal block (SSB), and wherein each of the one or more SCells do not include the SSB.

Example 21 is the method of Examples 19 and 20, wherein the one or more SCells and the PCell are contiguous in frequency.

Example 22 is the method of any of Examples 19 to 21, further comprising: sending reference signals, to the UE, on the PCell and not on the one or more SCells.

Example 23 is the method of any of Examples 19 to 22, further comprising: receiving, from the UE, channel state information (CSI) measurements corresponding to the PCell.

Example 24 is the method of any of Examples 19 to 23, wherein the communicating comprises adjusting transmissions on the PCell and the one or more SCells based on the received CSI measurements.

Example 25 is an apparatus for wireless communication, comprising: a memory; and at least one processor coupled to the memory and configured to: transmit, to a user equipment (UE), a configuration for carrier aggregation for a primary cell (PCell) and one or more secondary cells (SCells), wherein a total bandwidth of the PCell and the one or more SCells is not a defined bandwidth multiple; and communicate with the UE through the PCell and the one or more SCells.

Example 26 is the apparatus of Example 25, wherein the PCell includes a synchronization signal block (SSB), and wherein each of the one or more SCells do not include the SSB.

Example 27 is the apparatus of Examples 25 and 26, wherein the at least one SCell and the PCell are contiguous in frequency.

Example 28 is the apparatus of any of Examples 25 to 27, wherein the at least one processor is further configured to: send reference signals, to the UE, on the PCell and not on the one or more SCells.

Example 29 is the apparatus of any of Examples 25 to 28, wherein the at least one processor is further configured to: receive, from the UE, channel state information (CSI) measurements corresponding to the PCell.

Example 30 is the apparatus of any of Examples 25 to 29, wherein to communicate with the UE through the PCell the at least one processor is further configured to adjust transmissions on the PCell and the one or more Scells based on the received CSI measurements.

What is claimed is:

1. A method of wireless communication of a user equipment (UE), comprising:
   receiving, from a base station, a configuration for carrier aggregation for a primary cell (PCell) and one or more secondary cells (SCells), wherein a total bandwidth of the PCell and the one or more SCells is indivisible by a defined bandwidth multiple; and
   communicating with the base station through the PCell and the one or more SCells, wherein the communicating through the one or more SCells is based on a radio resource management (RRM) measurement associated with the PCell and is not based on any RRM measurement associated with the one or more SCells.

2. The method of claim 1, wherein each of the one or more SCells lack a synchronization signal block (SSB).

3. The method of claim 1, wherein at least one SCell of the one or more SCells has a bandwidth less than the defined bandwidth multiple.

4. The method of claim 3, wherein the at least one SCell of the one or more SCells has a bandwidth of less than 1.4 MHz.

5. The method of claim 4, wherein the at least one SCell of the one or more SCells has a bandwidth of less than 1 MHz.

6. The method of claim 5, wherein the at least one SCell of the one or more SCells has a bandwidth of 180 kHz.

7. The method of claim 1, wherein the one or more SCells and the PCell are contiguous in frequency.

8. The method of claim 1, further comprising:
performing the RRM measurement associated with the PCell without performing additional RRM measurements for the one or more SCells.

9. The method of claim 8, further comprising:
sending channel state information (CSI) measurements to the base station based on reference signals (RS) within the PCell.

10. The method of claim 9, wherein the one or more SCells do not include the RS, and the communicating with the one or more SCells is based on the RS within the PCell.

11. The method of claim 1, wherein the defined bandwidth multiple is one of 5 MHz, 10 MHz, 15 MHz, 20 MHz, 25 MHz, 30 MHz, 40 MHz, 50 MHz, 60 MHz, 70 MHz, 80 MHz, 90 MHz, or 100 MHz.

12. An apparatus for wireless communication, comprising:
a memory; and
at least one processor coupled to the memory and configured to:
receive, from a base station, a configuration for carrier aggregation for a primary cell (PCell) and one or more secondary cells (SCells), wherein a total bandwidth of the PCell and the one or more SCells is indivisible by a defined bandwidth multiple; and
communicate with the base station through the PCell and the one or more SCells;
wherein the at least one processor is further configured to communicate through the one or more SCells based on a radio resource management (RRM) measurement associated with the PCell and not based on any RRM measurement associated with the one or more SCells.

13. The apparatus of claim 12, wherein each of the one or more SCells lack a synchronization signal block (SSB).

14. The apparatus of claim 12, wherein the one or more SCells and the PCell are contiguous in frequency.

15. The apparatus of claim 12, wherein the at least one processor is further configured to:
perform the RRM measurement associated with the PCell without performing additional RRM measurements for the one or more SCells.

16. The apparatus of claim 15, wherein the at least one processor is further configured to:
send channel state information (CSI) measurements to the base station based on reference signals (RS) within the PCell.

17. The apparatus of claim 16, wherein the one or more SCells do not include the RS, and
the communication with the one or more SCells is based on the RS within the PCell.

18. The apparatus of claim 12, wherein the defined bandwidth multiple is one of 5 MHz, 10 MHz, 15 MHz, 20 MHz, 25 MHz, 30 MHz, 40 MHz, 50 MHz, 60 MHz, 70 MHz, 80 MHz, 90 MHz, or 100 MHz.

19. A method of wireless communication of a base station, comprising:
transmitting, to a user equipment (UE), a configuration for carrier aggregation for a primary cell (PCell) and one or more secondary cells (SCells), wherein a total bandwidth of the PCell and the one or more SCells is indivisible by a defined bandwidth multiple; and
communicating with the UE through the PCell and the one or more SCells, wherein the communicating through the one or more SCells is based on a radio resource management (RRM) measurement associated with the PCell and is not based on any RRM measurement associated with the one or more SCells.

20. The method of claim 19, wherein the PCell includes a synchronization signal block (SSB), and wherein each of the one or more SCells lack the SSB.

21. The method of claim 19, wherein the one or more SCells and the PCell are contiguous in frequency.

22. The method of claim 19, further comprising:
sending reference signals, to the UE, on the PCell and not on the one or more SCells.

23. The method of claim 19, further comprising:
receiving, from the UE, channel state information (CSI) measurements corresponding to the PCell.

24. The method of claim 23, wherein the communicating comprises adjusting transmissions on the PCell and the one or more SCells based on the received CSI measurements.

25. An apparatus for wireless communication, comprising:
a memory; and
at least one processor coupled to the memory and configured to:
transmit, to a user equipment (UE), a configuration for carrier aggregation for a primary cell (PCell) and one or more secondary cells (SCells), wherein a total bandwidth of the PCell and the one or more SCells is indivisible by a defined bandwidth multiple; and
communicate with the UE through the PCell and the one or more SCells;
wherein the at least one processor is further configured to communicate through the one or more SCells based on a radio resource management (RRM) measurement associated with the PCell and not based on any RRM measurement associated with the one or more SCells.

26. The apparatus of claim 25, wherein the PCell includes a synchronization signal block (SSB), and wherein each of the one or more SCells lack the SSB.

27. The apparatus of claim 25, wherein the one or more SCells and the PCell are contiguous in frequency.

28. The apparatus of claim 25, wherein the at least one processor is further configured to:
send reference signals, to the UE, on the PCell and not on the one or more SCells.

29. The apparatus of claim 25, wherein the at least one processor is further configured to:
receive, from the UE, channel state information (CSI) measurements corresponding to the PCell.

30. The apparatus of claim 29, wherein to communicate with the UE through the PCell, the at least one processor is further configured to adjust transmissions on the PCell and the one or more SCells based on the received CSI measurements.

* * * * *